US009251665B2

(12) United States Patent
Jackson

(10) Patent No.: US 9,251,665 B2
(45) **Date of Patent: *Feb. 2, 2016**

(54) GAMING SYSTEM AND METHOD FOR PROVIDING AUTOMATIC WILD CARD ASSIGNMENT IN VIDEO POKER GAMES

(71) Applicant: IGT, Reno, NV (US)

(72) Inventor: Kathleen Nylund Jackson, Scituate, MA (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/901,271

(22) Filed: May 23, 2013

(65) Prior Publication Data

US 2013/0260855 A1 Oct. 3, 2013

Related U.S. Application Data

(63) Continuation of application No. 11/897,922, filed on Aug. 30, 2007, now Pat. No. 8,449,362.

(60) Provisional application No. 60/840,993, filed on Aug. 30, 2006.

(51) Int. Cl.
*A63F 13/00* (2014.01)
*G07F 17/32* (2006.01)

(52) U.S. Cl.
CPC ............ *G07F 17/3293* (2013.01); *G07F 17/32* (2013.01); *G07F 17/3262* (2013.01)

(58) Field of Classification Search
CPC ......................... G07F 17/3262; G07F 17/3293
USPC ............................................................ 463/13
See application file for complete search history.

(56) References Cited

U.S. PATENT DOCUMENTS

| | | | |
|---|---|---|---|
| 5,167,413 A | 12/1992 | Fulton | |
| 5,251,897 A | 10/1993 | Fulton | |
| 5,308,065 A | 5/1994 | Bridgeman et al. | |
| 5,322,295 A | 6/1994 | Cabot et al. | |
| 5,332,228 A | 7/1994 | Schultz | |
| 5,411,257 A | 5/1995 | Fulton | |
| 5,431,408 A | 7/1995 | Adams | |

(Continued)

FOREIGN PATENT DOCUMENTS

| | | |
|---|---|---|
| WO | WO 98/14250 | 4/1998 |
| WO | WO 98/52666 | 11/1998 |

(Continued)

*Primary Examiner* — Milap Shah
*Assistant Examiner* — Thomas H Henry
(74) *Attorney, Agent, or Firm* — Neal, Gerber & Eisenberg LLP

(57) ABSTRACT

A video poker game including a wild card feature is provided. For a play of the video poker game, a predetermined number of cards are randomly dealt from a players standard deck of 52 cards to form an initial player hand. If the player made a side bet, at least one up to the predetermined number of cards are simultaneously dealt from a separate deck to form a house hand. Any cards in the initial player hand that match any cards in the house hand are automatically changed into a wild card. The player chooses which cards to hold and which cards to discard from the initial player hand. Replacement cards for the discarded cards are dealt from the remainder of cards in the players deck to form a final player hand. The final player hand is evaluated according to a predetermined paytable and any awards are provided.

18 Claims, 12 Drawing Sheets

(56) References Cited

U.S. PATENT DOCUMENTS

| | | | | | |
|---|---|---|---|---|---|
| 5,437,451 | A | | 8/1995 | Fulton | |
| 5,531,448 | A | | 7/1996 | Moody | |
| 5,636,842 | A | | 6/1997 | Cabot et al. | |
| 5,732,950 | A | | 3/1998 | Moody | |
| 5,755,621 | A | | 5/1998 | Marks et al. | |
| 5,803,809 | A | | 9/1998 | Yoseloff | |
| 5,820,460 | A | | 10/1998 | Fulton | |
| 5,823,873 | A | | 10/1998 | Moody | |
| 5,833,536 | A | | 11/1998 | Davids et al. | |
| 5,882,259 | A | | 3/1999 | Holmes, Jr. et al. | |
| 5,911,418 | A | | 6/1999 | Adams | |
| 5,947,821 | A | * | 9/1999 | Stone | 463/13 |
| 5,957,774 | A | * | 9/1999 | Holmes et al. | 463/13 |
| 6,007,066 | A | | 12/1999 | Moody | |
| 6,012,720 | A | | 1/2000 | Webb | |
| 6,050,568 | A | | 4/2000 | Hachquet | |
| 6,062,979 | A | | 5/2000 | Inoue | |
| 6,089,977 | A | | 7/2000 | Bennett | |
| 6,098,985 | A | | 8/2000 | Moody | |
| 6,120,031 | A | | 9/2000 | Adams | |
| 6,179,711 | B1 | | 1/2001 | Yoseloff | |
| 6,193,235 | B1 | | 2/2001 | Vancura et al. | |
| 6,196,547 | B1 | | 3/2001 | Pascal et al. | |
| 6,220,960 | B1 | | 4/2001 | Kryzhanovsky | |
| 6,227,969 | B1 | | 5/2001 | Yoseloff | |
| 6,251,013 | B1 | | 6/2001 | Bennett | |
| 6,311,976 | B1 | | 11/2001 | Yoseloff et al. | |
| 6,322,078 | B1 | | 11/2001 | Adams | |
| 6,334,613 | B1 | | 1/2002 | Yoseloff | |
| 6,346,043 | B1 | | 2/2002 | Colin et al. | |
| 6,406,023 | B1 | | 6/2002 | Rowe | |
| 6,419,578 | B1 | | 7/2002 | Moody et al. | |
| 6,439,993 | B1 | | 8/2002 | O'Halloran | |
| 6,457,715 | B1 | | 10/2002 | Friedman | |
| 6,461,240 | B1 | | 10/2002 | Perkins | |
| 6,494,454 | B2 | | 12/2002 | Adams | |
| 6,517,074 | B1 | | 2/2003 | Moody | |
| 6,517,432 | B1 | | 2/2003 | Jaffe | |
| 6,561,898 | B2 | | 5/2003 | Moody | |
| 6,568,680 | B1 | | 5/2003 | Moody et al. | |
| 6,599,185 | B1 | | 7/2003 | Kaminkow et al. | |
| 6,604,740 | B1 | | 8/2003 | Singer et al. | |
| 6,631,906 | B1 | | 10/2003 | Timpano | |
| 6,632,139 | B1 | | 10/2003 | Baerlocher | |
| 6,634,941 | B2 | | 10/2003 | Olive | |
| 6,652,377 | B1 | | 11/2003 | Moody | |
| 6,669,599 | B2 | | 12/2003 | Baerlocher et al. | |
| 6,672,959 | B2 | | 1/2004 | Moody et al. | |
| 6,729,961 | B1 | | 5/2004 | Millerschone | |
| 6,749,502 | B2 | | 6/2004 | Baerlocher | |
| 6,780,109 | B2 | | 8/2004 | Kaminkow | |
| 6,805,349 | B2 | | 10/2004 | Baerlocher et al. | |
| 6,855,053 | B2 | | 2/2005 | Baerlocher | |
| 6,866,583 | B2 | | 3/2005 | Glavich et al. | |
| 6,899,620 | B2 | | 5/2005 | Kaminkow et al. | |
| 6,905,406 | B2 | | 6/2005 | Kaminkow et al. | |
| 6,921,335 | B2 | | 7/2005 | Rodgers et al. | |
| 6,955,356 | B2 | | 10/2005 | Moody | |
| 6,964,416 | B2 | | 11/2005 | McClintic et al. | |
| 6,964,418 | B2 | | 11/2005 | Moody | |
| 6,991,538 | B2 | | 1/2006 | Cannon | |
| 6,994,624 | B2 | | 2/2006 | Gold et al. | |
| 7,040,983 | B2 | | 5/2006 | Dolloff et al. | |
| 7,048,275 | B2 | | 5/2006 | Adams | |
| 7,056,192 | B2 | | 6/2006 | Venigalla et al. | |
| 7,059,965 | B2 | | 6/2006 | Jackson | |
| 7,070,502 | B1 | | 7/2006 | Bussick et al. | |
| 7,074,127 | B2 | | 7/2006 | Cuddy et al. | |
| 7,090,580 | B2 | | 8/2006 | Rodgers et al. | |
| 7,094,148 | B2 | | 8/2006 | Baerlocher et al. | |
| 7,128,645 | B1 | | 10/2006 | White et al. | |
| 7,128,646 | B2 | | 10/2006 | Baerlocher et al. | |
| 7,137,628 | B2 | | 11/2006 | Moody | |
| 7,156,397 | B2 | | 1/2007 | Moody et al. | |
| 7,159,868 | B2 | | 1/2007 | Webb | |
| 7,160,188 | B2 | | 1/2007 | Kaminkow et al. | |
| 7,166,028 | B2 | | 1/2007 | Fasbender et al. | |
| 7,169,042 | B2 | | 1/2007 | Muir et al. | |
| 7,175,522 | B2 | | 2/2007 | Hartl | |
| 7,222,856 | B2 | | 5/2007 | Dodge | |
| 7,222,857 | B2 | | 5/2007 | Moody | |
| 7,237,775 | B2 | | 7/2007 | Thomas et al. | |
| 7,246,799 | B2 | | 7/2007 | Snow | |
| 7,247,092 | B2 | | 7/2007 | Jarvis et al. | |
| 7,297,057 | B2 | | 11/2007 | Gerrard et al. | |
| 7,331,866 | B2 | | 2/2008 | Rodgers et al. | |
| 7,354,344 | B2 | | 4/2008 | Paulsen et al. | |
| 7,377,514 | B1 | | 5/2008 | Timpano et al. | |
| 7,396,279 | B2 | | 7/2008 | Berman et al. | |
| 7,399,226 | B2 | | 7/2008 | Mishra | |
| 2002/0034974 | A1 | | 3/2002 | Wood et al. | |
| 2002/0052233 | A1 | | 5/2002 | Gauselmann | |
| 2003/0104851 | A1 | | 6/2003 | Merari | |
| 2003/0113517 | A1 | | 6/2003 | Imamura et al. | |
| 2003/0130024 | A1 | | 7/2003 | Darby | |
| 2003/0186737 | A1 | | 10/2003 | Bennett et al. | |
| 2004/0033827 | A1 | | 2/2004 | Gilmore et al. | |
| 2004/0048651 | A1 | | 3/2004 | Vorias et al. | |
| 2004/0053676 | A1 | | 3/2004 | Rodgers | |
| 2005/0054421 | A1 | | 3/2005 | Hughs-Baird et al. | |
| 2005/0127606 | A1 | | 6/2005 | Snow et al. | |
| 2005/0148384 | A1 | | 7/2005 | Marks et al. | |
| 2005/0202863 | A1 | | 9/2005 | Macaulay | |
| 2005/0239527 | A1 | | 10/2005 | Moody | |
| 2005/0288090 | A1 | | 12/2005 | Thomas et al. | |
| 2006/0040721 | A1 | | 2/2006 | Cuddy et al. | |
| 2006/0052148 | A1 | | 3/2006 | Blair, Jr. et al. | |
| 2006/0063578 | A1 | | 3/2006 | Bansemer et al. | |
| 2006/0063584 | A1 | | 3/2006 | Brill et al. | |
| 2006/0066051 | A1 | | 3/2006 | Nicely | |
| 2006/0068875 | A1 | | 3/2006 | Cregan | |
| 2006/0073876 | A1 | | 4/2006 | Cuddy | |
| 2006/0084494 | A1 | | 4/2006 | Belger et al. | |
| 2006/0089191 | A1 | | 4/2006 | Singer et al. | |
| 2006/0131809 | A1 | | 6/2006 | Lancaster et al. | |
| 2006/0131810 | A1 | | 6/2006 | Nicely | |
| 2006/0154714 | A1 | | 7/2006 | Montross et al. | |
| 2006/0246977 | A1 | | 11/2006 | Cannon | |
| 2006/0267283 | A1 | | 11/2006 | Jackson | |
| 2006/0284378 | A1 | | 12/2006 | Snow et al. | |
| 2007/0026920 | A1 | | 2/2007 | Flint et al. | |
| 2007/0054721 | A1 | | 3/2007 | Jackson | |
| 2007/0060241 | A1 | | 3/2007 | Low et al. | |
| 2007/0060248 | A1 | | 3/2007 | Rodgers et al. | |
| 2007/0135193 | A1 | | 6/2007 | Nicely | |
| 2007/0135194 | A1 | | 6/2007 | Nicely | |
| 2007/0228656 | A1 | | 10/2007 | Jackson | |
| 2008/0026806 | A1 | | 1/2008 | Gold et al. | |
| 2008/0167105 | A1 | | 7/2008 | Kaminkow | |

FOREIGN PATENT DOCUMENTS

| | | |
|---|---|---|
| WO | WO 00/32286 | 6/2000 |
| WO | WO 00/66235 | 11/2000 |

* cited by examiner

GAMING SYSTEM AND METHOD FOR PROVIDING AUTOMATIC WILD CARD ASSIGNMENT IN VIDEO POKER GAMES

PRIORITY CLAIM

This application is a continuation of, and claims priority to and the benefit of, U.S. patent application Ser. No. 11/897,922, filed on Aug. 30, 2007, which claims priority to and the benefit of U.S. Provisional Patent Application No. 60/840,993, filed on Aug. 30, 2006, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records but otherwise reserves all copyright rights whatsoever.

BACKGROUND

Electronic casino games, whether video poker or slot games, have grown exponentially in numbers in the last twenty years, as have the revenues generated by such machine games. It has been estimated that more than 70% of any casino's revenue is now provided by machine games as opposed to table games.

Video poker in particular has become enormously popular with the casino player who prefers a game that requires decision-making. Although video poker is a randomly-dealt game of chance, there is an element of skill involved in the game play. After the player is dealt an initial hand, usually consisting of five cards, the player may select which cards to hold and which cards to discard. Replacement cards are provided for the discarded cards, and the final hand is evaluated for wins according to a predetermined paytable. By applying an optimal strategy in the hold/discard phase, the player can increase his chance of winning and/or decrease the average house hold.

Standard video poker games consist mainly of two types of games: non-wild and wild card games. Non-wild games are exemplified by the most basic game of Jacks or Better, and include many other variations such as Bonus Poker and Double Bonus Poker. The two most popular wild card games are Deuces Wild and Joker Poker. In these games, certain cards are wild (the 2s in Deuces Wild, the Joker(s) in Jokers Wild), i.e., the wild card may be considered to be any other card, so as to enable the player to more easily make a winning hand. Wild card games are often more exciting to play, but the pays for most winning combinations are usually lower than in the non-wild games.

There is a continuing need to provide new video poker games which blend the pays of standard non-wild video poker games with the excitement of wild card games to provide unique and exciting ways to play video poker. Accordingly, one advantage of the present invention is to provide players with new and enticing features that will stimulate player interest and increase time on the machine. In particular, the present invention seeks to provide the player with a dynamic game play that will heighten the player's expectations, boost confidence in the likelihood of a winning result, and provide non-wild pays for wild card play.

SUMMARY

The present invention relates to electronic poker games suitable for use in casinos, on-line and in other gaming enterprises. The invention further relates to video gaming play that provides a random deal of a player's or first hand along with a random deal of a house or second hand in which cards in the player's hand that match cards in the house hand are considered wild.

In one embodiment, a monitor screen is provided on which card symbols may be provided for use in a video poker game. In the video poker game, the player makes a wager to play an underlying draw poker game consisting of at least a single hand of poker. An additional bet or "side bet" may be required to utilize a wild card play option, the side bet being made before any cards are dealt. A predetermined number of initial cards are randomly dealt from a standard deck or decks of 52 cards (or up to 54 cards including jokers) to form the initial player's hand.

In one embodiment, if the player has made a side bet wager, at least one up to the predetermined number of player's hand cards are simultaneously (or nearly simultaneously) dealt from a separate set (less or more than a complete multiple of a deck), deck or decks to a house hand. In one such embodiment, the player's hand is prominently displayed (e.g., in a central orientation) on the monitor screen and the house hand is conveniently displayed (e.g., above or below), with the first card of the house hand in an easily compared orientation (e.g., directly below) with respect to the first card of the player's hand, the second card of the house hand directly below the second card of the player's hand, and so on.

In one embodiment, any cards in the player's hand that match any cards in the house hand (e.g., either in the exact adjacent location, such as the second cards in both hands, or anywhere in the two hands) by rank, suit and/or position are automatically changed to be wild cards, i.e., cards that can be considered to be any card in order to help achieve an optimum winning combination. A software program will automatically determine what specific card (or general card, such as a fifth ranked card added to four-of-a-kind) will best benefit the rank of the hand. The wild card may remain fixed throughout the remainder of the game or may change as replacement cards are drawn and the wild card might preferably be a different card then originally selected.

In one embodiment, the player chooses which cards to hold and which cards to discard from the player's hand. Replacement cards for the discarded cards are dealt from the remainder of cards in the player's hand deck. The outcome for this final hand is evaluated according to a predetermined paytable. In one such embodiment, the predetermined paytable offers the traditional pays of a standard video poker game, and wherein the wild card option feature does not significantly lower the paytable but rather is compensated for by the side bet, varying certain payouts such as the full house or flush, and/or providing additional specific pays such as a wild royal, 5-of-a-kind and 5 wilds. Any winning payout amounts are then provided to the player.

Those trained in the art will appreciate that these play options are exemplary and are not intended to dictate an exclusive method of play, nor limit or restrict specific game play. This invention may be played in the aforementioned single-hand game format as well as in a multi-hand format with multiple player hands against a single dealer hand. The wild card play methods may be utilized with any standard non-wild video poker game versions, as well as with standard wild video poker game versions.

Additional features and advantages of the present invention are described in, and will be apparent from, the following Detailed Description of the Invention and the figures.

DETAILED DESCRIPTION

The present disclosure may be implemented in various configurations for gaming machines, gaming devices or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
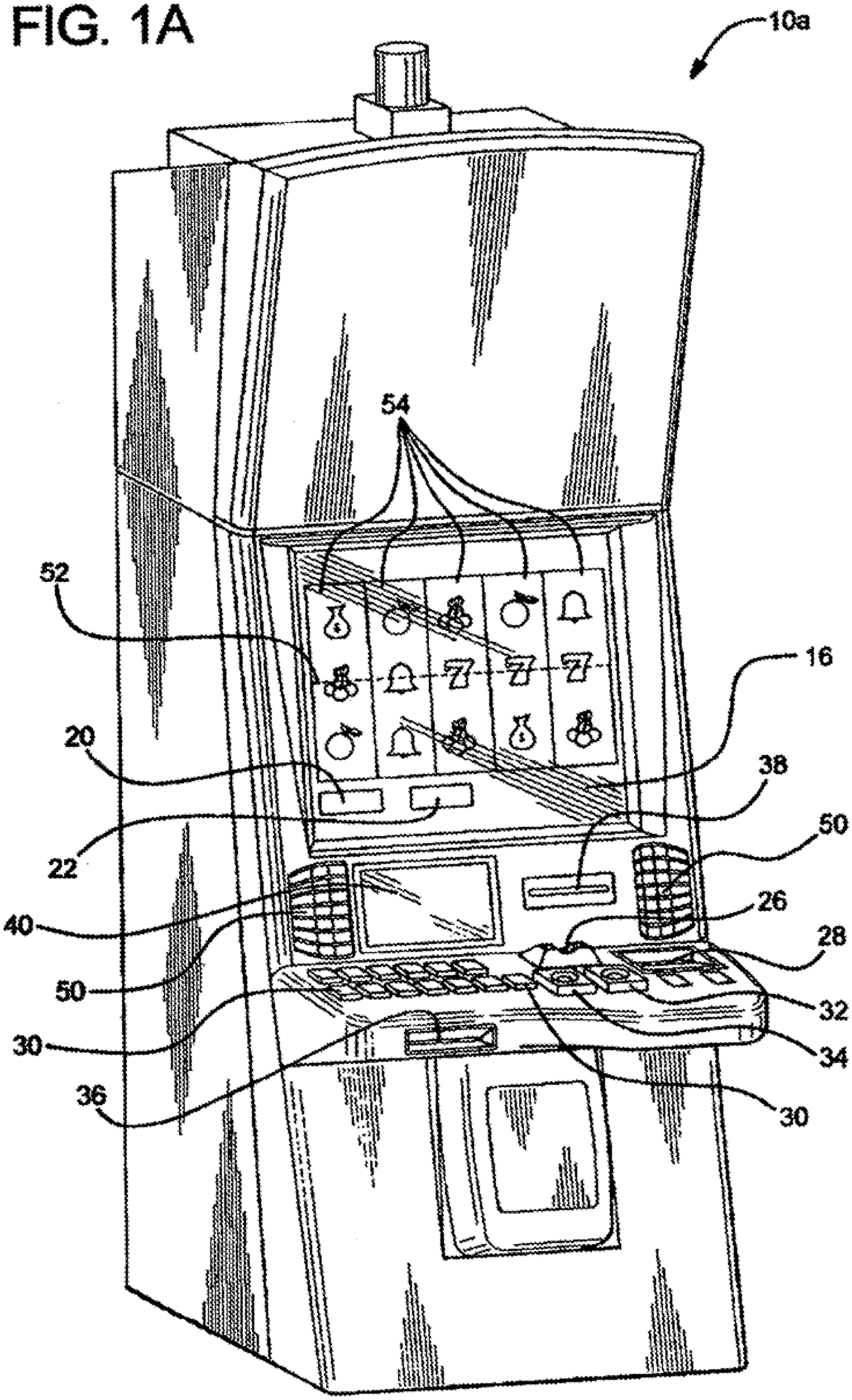
FIG. 1A is a front-side perspective view of one embodiment of the gaming device disclosed herein.
Figure 1B:
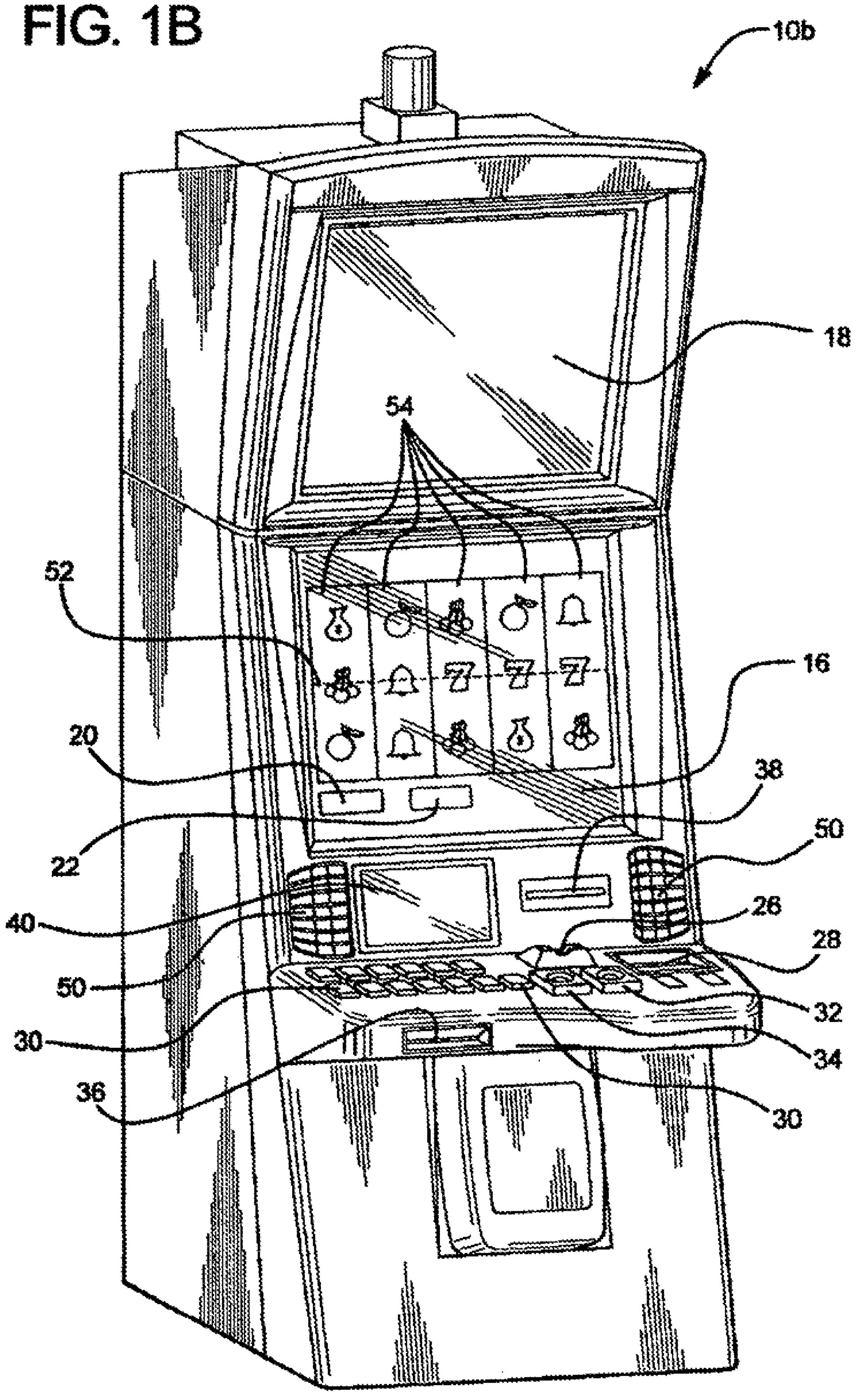
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
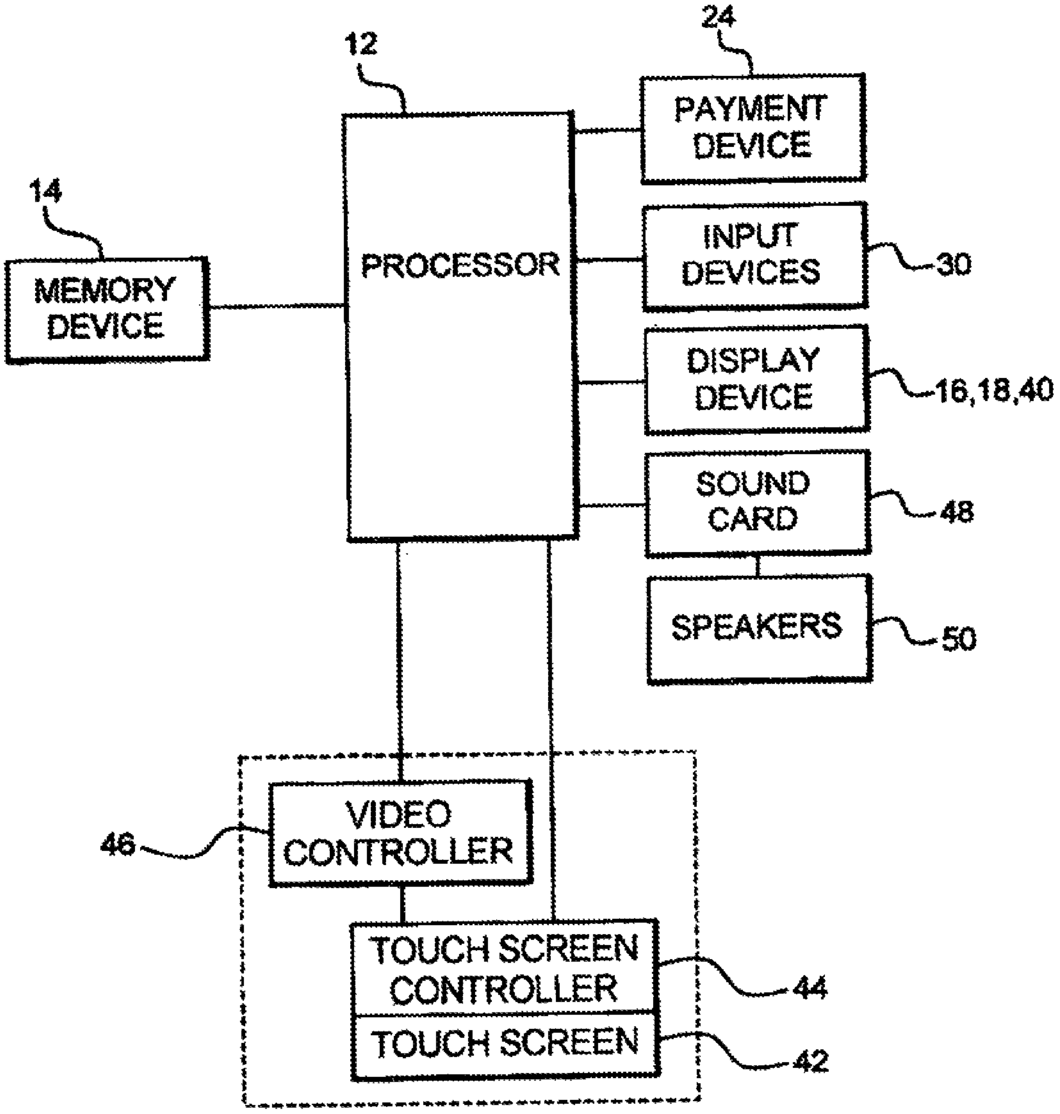
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 16, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game if the poker game described herein is implemented as a bonus or secondary game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, if the poker game described herein is implemented as a bonus or secondary game, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, if the poker game described herein is implemented as a bonus or secondary game, a base or primary game may be another poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch-screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, if the poker game described herein is implemented as a bonus or secondary game, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, if the poker game described herein is implemented as a bonus or secondary game, a base or primary game may be a keno game wherein the gaming device displays a plurality of selectable indicia or numbers on at least one of the display devices. In this embodiment, the player selects at least one or a plurality of the selectable indicia or numbers via an input device such as the touch-screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, if the poker game described herein is implemented as a base or primary game, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
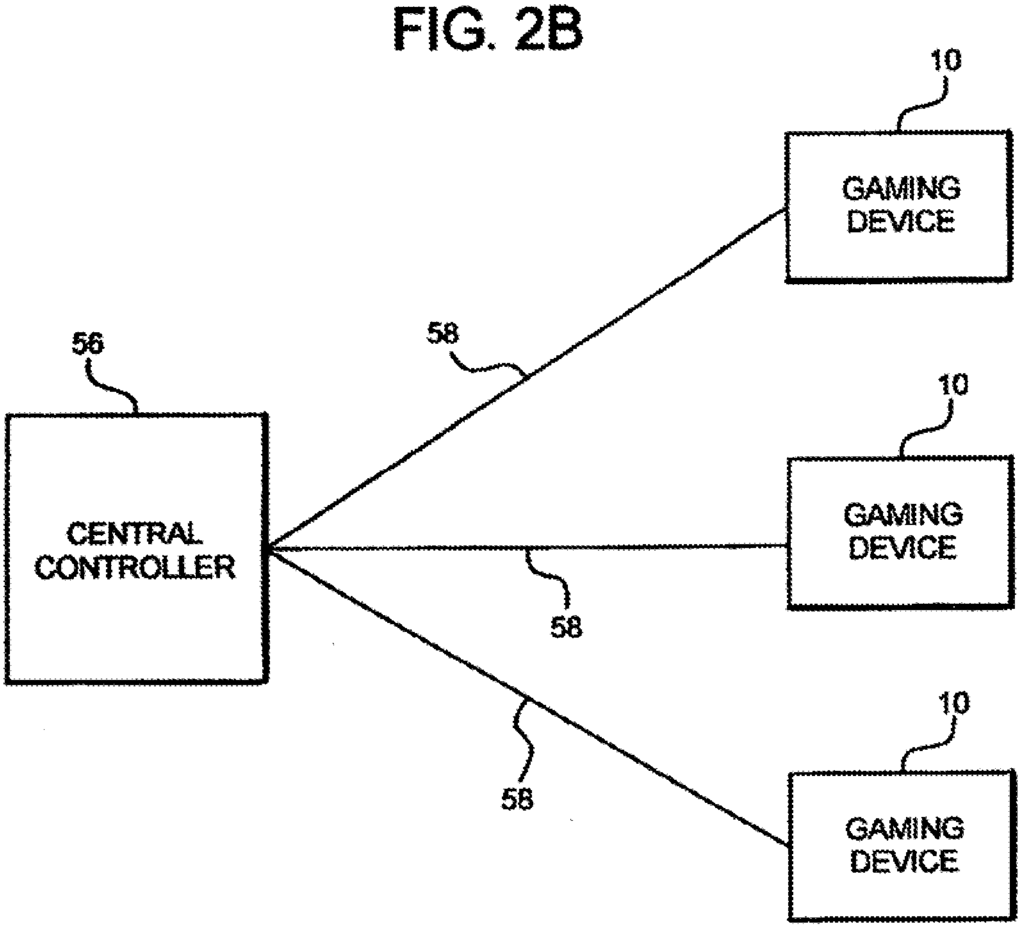
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Poker Game with Wild Cards

In one embodiment, a processor driven system with a monitor screen is provided. Card symbols may be provided for view on the monitor screen for use in a video poker game. In the video poker game, the player makes a wager to play an underlying draw poker game consisting of at least a single hand of poker. In one embodiment, an additional bet or "side bet" may be required to utilize a wild card play option, the side bet being made before any cards are dealt. In different embodiments, the amount of the additional bet or side bet required to utilize the wild card play option is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, a predetermined number of initial cards are randomly dealt from a standard deck or decks of 52 cards (or up to 54 cards including jokers) to form the initial player's hand or first hand. If the player has made a side bet wager, at least one up to the predetermined number of player's hand cards are simultaneously (or nearly simultaneously) dealt from a separate deck or decks to for a house or dealer's hand or second hand. In one such embodiment, the player's hand is displayed in a central orientation on the monitor screen and the house hand is displayed below, with the first card of the house hand directly below the first card of the player's hand, the second card of the house hand directly below the second card of the player's hand, and so on. It should be appreciated that the player's hand and the house hand may be displayed in any suitable configuration.

In one embodiment, any cards in the player's hand that match any cards in the house hand by rank, suit and/or position are automatically changed to be wild cards. In this embodiment, a wild card is a card that can be considered to be any card in order to help achieve an optimum winning combination. In different embodiments, the determination of if any card in the player's hand must match the rank and/or suit and/or position of any card in the house hand is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the players primary game wager, determined based on time (such as the time of day), determined based on an amount of coin-in accumulated in one or more pools or determined based on any other suitable method or criteria.

In one embodiment, the player chooses which cards to hold and which cards to discard from the player's hand. Replacement cards for the discarded cards are dealt from the remainder of cards in the player's hand deck. The outcome for this final hand is evaluated according to a predetermined paytable.

In one embodiment, cards in the initial player's hand deal that have become wild may or may not appear in the replacement card set. In different embodiments, the determination of if playing cards in the initial player's hand that have become wild appear in the replacement card set is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, the predetermined paytable offers the traditional pays of a standard video poker game, and wherein the wild card option feature does not significantly lower the paytable but rather is compensated for by the side bet, varying certain payouts such as the full house or flush, and/or providing additional specific pays such as a wild royal, 5-of-a-kind and 5 wilds. Any winning hands are then provided with payouts distributed to the player. A software program will automatically determine what specific card (or general card, such as a fifth ranked card added to four-of-a-kind) will best benefit the rank of the hand. The wild card may remain fixed throughout the remainder of the game or may change as replacement cards are drawn and the wild card might preferably be a different card then originally selected. In different embodiments, the determination of whether a wild card remains fixed or changes as replacement cards are drawn is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment of the gaming system disclosed herein requires a maximum wager on the base game, for example, 5 credits to play a single hand of 5-card draw poker. The side bet would require a wager of at least one credit for a 5-card house hand. After the wagering is completed, the gaming device initiates the deal, wherein a 5-card hand is randomly dealt from a 52-card deck to the player's hand, and a 5-card hand is randomly dealt from a separate 52-card deck to the house hand. On the monitor screen, the first card in the player's hand is positioned directly over the first card of the house hand, and likewise for the rest of the cards. If any card in the player's hand matches the rank AND suit AND position of any card in the house hand, that player card is immediately changed into a wild card. By adjusting the odds and payout amounts, a more general appearance of wild cards may be provided, as by not requiring that cards match in the exact adjacent location, such as the second cards in both hands, but rather may appear in any position in the two hands.

In one embodiment, the graphics of rank and suit on said card(s) may be reduced in color intensity, so as to provide a muted but still visible appearance, while a more prominent "WILD" indicia is placed thereon. The player may choose to hold none, one, some or all of the player's hand cards, and the rest of the player cards are discarded. The discarded cards are randomly replaced with replacement cards from the remainder of the player's deck, and a final hand is shown. The final hand is evaluated according to a predetermined paytable and any wins are provided to the player. Because the frequency of the specific match wild card event is low (1/52), the paytable may remain the same or be changed. The amount of the side bet must appear worthwhile with respect to the amount to be won with a wild card hand.

In another embodiment of the gaming system disclosed herein requires a maximum wager on the base game, for example, 5 credits to play a single hand of 5-card draw poker. The side bet would require a wager of at least one credit per card in the house hand. Alternately, the per card wager on the house hand may be in escalating fashion, for example one credit for one card, three credits for two cards, six credits for three cards, ten credits for four cards, or fifteen credits for five cards. In different embodiments, the per card wager on the house hand is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

After the wagering is completed, the gaming device initiates the deal, wherein a 5-card hand is randomly dealt from a conventional 52-card deck to the player's hand, and at least one card and up to five cards are randomly dealt from a separate conventional 52-card deck to the house hand. On the monitor screen, the first card in the player's hand is positioned directly over the first card of the house hand, and likewise for the rest of the cards if there is more than one card in the house hand. If any card in the player's hand matches the rank AND suit (but not necessarily the position) of any card in the house hand, that player card is immediately changed into a wild card. The graphics of rank and suit on said card(s) may be reduced in color intensity, so as to provide a muted but still visible appearance, while a more prominent "WILD" indicia is placed thereon. The player may then choose to hold none, one, some or all of the player's hand cards, and the rest of the player cards are discarded. The discarded cards are randomly replaced with replacement cards from the remainder of the player's deck, and a final hand is shown. The final hand is evaluated according to a predetermined paytable and any wins are provided to the player.

It is also an optional format for all five of the dealer's hand cards to be dealt in a line adjacent a single players card (forming a perpendicular line of five cards with respect to the player's hand, with each of the five cards compared to a single player card or for a greater initial wager, compared against all five player cards).

In another embodiment of the gaming system disclosed herein requires a maximum wager on the base game, for example, 5 credits to play a single hand of 5-card draw poker. The side bet would require a wager of at least one credit per card in the house hand. After the wagering is completed, the gaming device initiates the deal, wherein a 5-card hand is randomly dealt from a 52-card deck to the player's hand, and at least one card and up to five cards are randomly dealt from a separate 52-card deck to the house hand. On the monitor screen, the first card in the player's hand is positioned directly over the first card of the house hand, and likewise for the rest of the cards if there is more than one wagered card in the house hand. If any card in the player's hand matches the rank. AND position (but not necessarily the suit) of any card in the house hand, that player card is immediately changed into a wild card. The graphics of rank and suit on said card(s) may be reduced in color intensity, so as to provide a muted but still visible appearance, while a more prominent "WILD" indicia is placed thereon. The player may choose to hold none, one, some or all of the player's hand cards, and the rest of the player cards are discarded. The discarded cards are randomly replaced with replacement cards from the remainder of the player's deck, and a final hand is shown. The final hand is evaluated according to a predetermined paytable and any wins are provided to the player.

An additional element may be applied to any the foregoing embodiments: any replacement cards that match any of the house cards may themselves be considered to be wild cards. This adds extra anticipation and excitement to the draw step, although it may require a larger side bet wager. In different embodiments, the determination of if any replacement cards that match any of the house cards may themselves be considered to be wild cards is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the players primary game wager, determined based on time (such as the time of day), determined based on an amount of coin-in accumulated in one or more pools or determined based on any other suitable method or criteria.

In another embodiment, a similar but separate game play incorporates all of the present invention's features as previously described, except that the WILD cards and WILD indicia are replaced by MULTIPLIER cards and MULTIPLIER indicia respectively. In other words, matching cards in the player's hand and house hand become random multipliers (from 2× pay to 10× pay, for instance) in the players hand. The multiplier cards may or may not keep their original rank and suit. In different embodiments, the amounts of each multiplier is predetermined, randomly determined, determined based on the player's status (such as determined through a player tracking system), determined based on a generated symbol or symbol combination, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

It should be appreciated that the assignment of a wild symbol and/or multiplier disclosed herein may be implemented in accordance with any suitable primary game or any suitable secondary game which may include one or more wild symbols (or one or more multipliers). In different embodiments, the determination described herein of which symbol to function as a wild symbol or a multiplier symbol is incorporated into any suitable slot game, any suitable card game, any suitable keno game, any suitable bingo game, any suitable craps game, any suitable roulette game, any suitable baccarat game, any suitable wheel game, any suitable selection game, any suitable offer and acceptance game, any suitable cascading symbols game, any suitable ways to win game, any suitable scatter pay game or any other suitable type of game.

Figure 3:
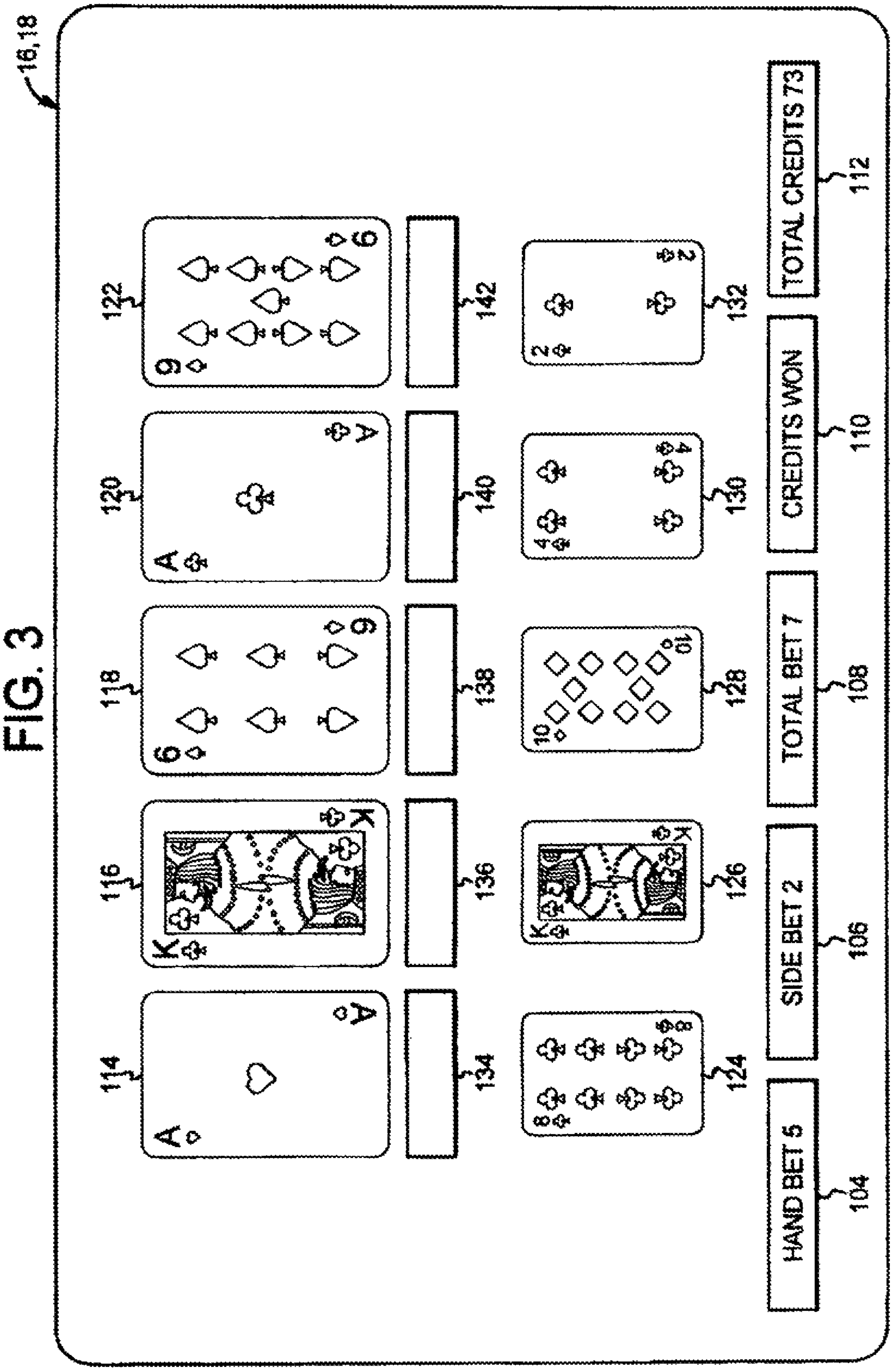
FIGS. 3, 4, 5 and 6 are front elevational views of one embodiment of the gaming device disclosed herein illustrating different stages of an example poker game disclosed herein.

FIG. 3 shows a video poker machine monitor screen 16, 18 with five touch-screen HOLD/DISCARD buttons for card play selection (134, 136, 138, 140, 142). The player has wagered 5 credits to play a 5-card player's hand of Jacks or Better poker as shown on the touch-screen button 104. The player has also wagered 2 credits as a Side Bet to play the wild card bonus option as shown on the touch-screen button 106. The wild card bonus option rules require that any matches between the player's hand and the house hand must include rank, suit AND position. The Total Bet of 7 credits is shown in the box 108. A Credits Won box is shown 110, along with the player's Total Available Credits (73 credits after the 7 credit wager) 112. The result of the initial deal of the player's hand from a first deck of 52 cards is shown, with the Ace of Hearts 114 in the first card position, the King of Clubs 116 in the second card position, the 6 of Spades 118 in the third card position, the Ace of Clubs 120 in the fourth card position, and the 9 of Spades 122 in the fifth card position. The wild card bonus option provides a 5-card house hand from a separate second 52-card deck, the result of which shows the 8 of Clubs 124 in the first card position, the King of Clubs 126 in the second card position, the 10 of Diamonds 128 in the third card position, the 4 of Clubs 130 in the fourth card position, and the 2 of Clubs 132 in the fifth card position.

Figure 4:
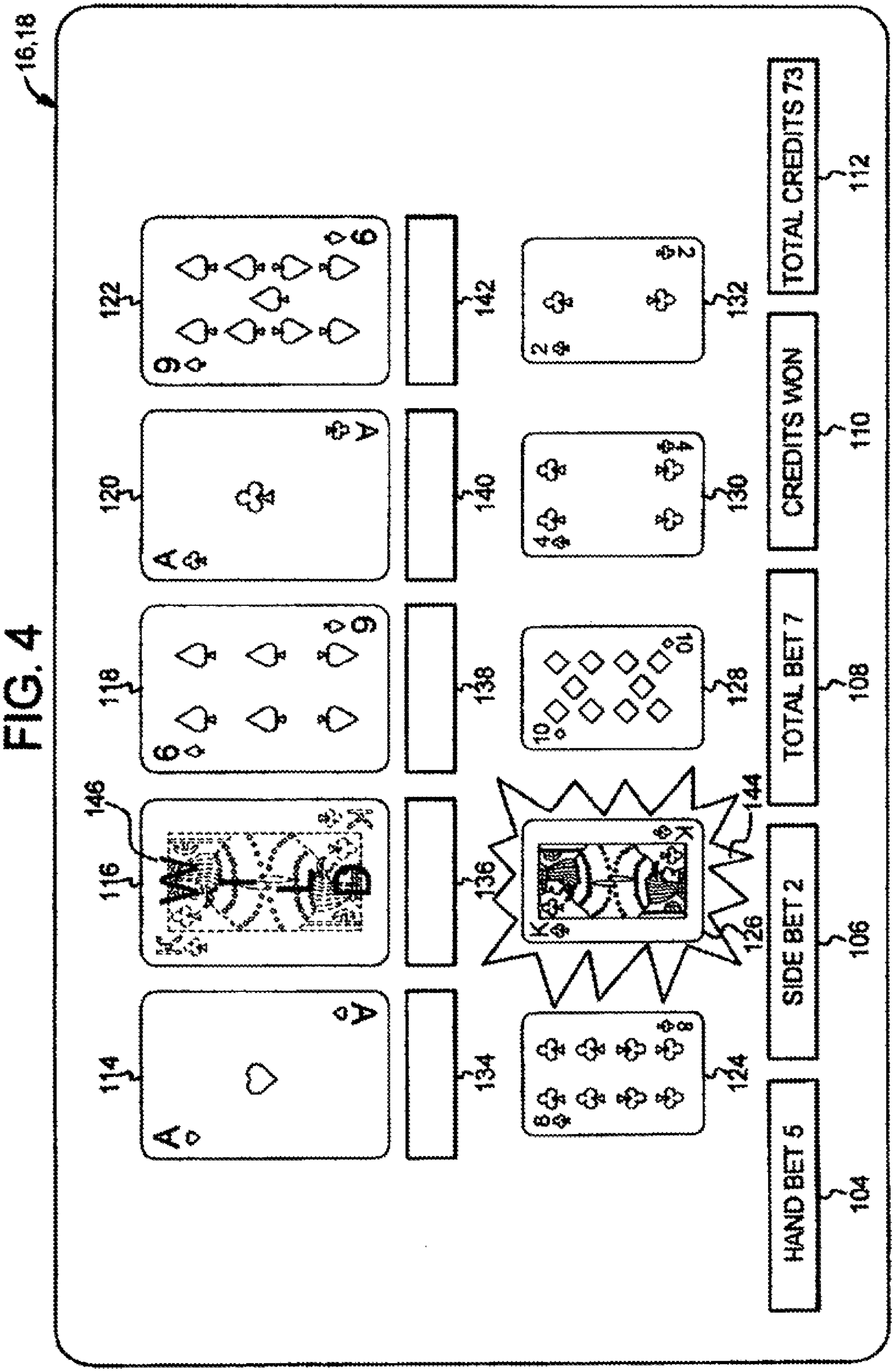

FIG. 4 refers to the game elements shown in FIG. 3 with the King of Clubs 126 in the house hand being highlighted 144 because it matches the rank, suit and position of the King of Clubs 116 in the player's hand. The graphics on the King of Clubs 116 in the player's hand are muted and a WILD indicia 146 is superimposed on the card.

Figure 5:
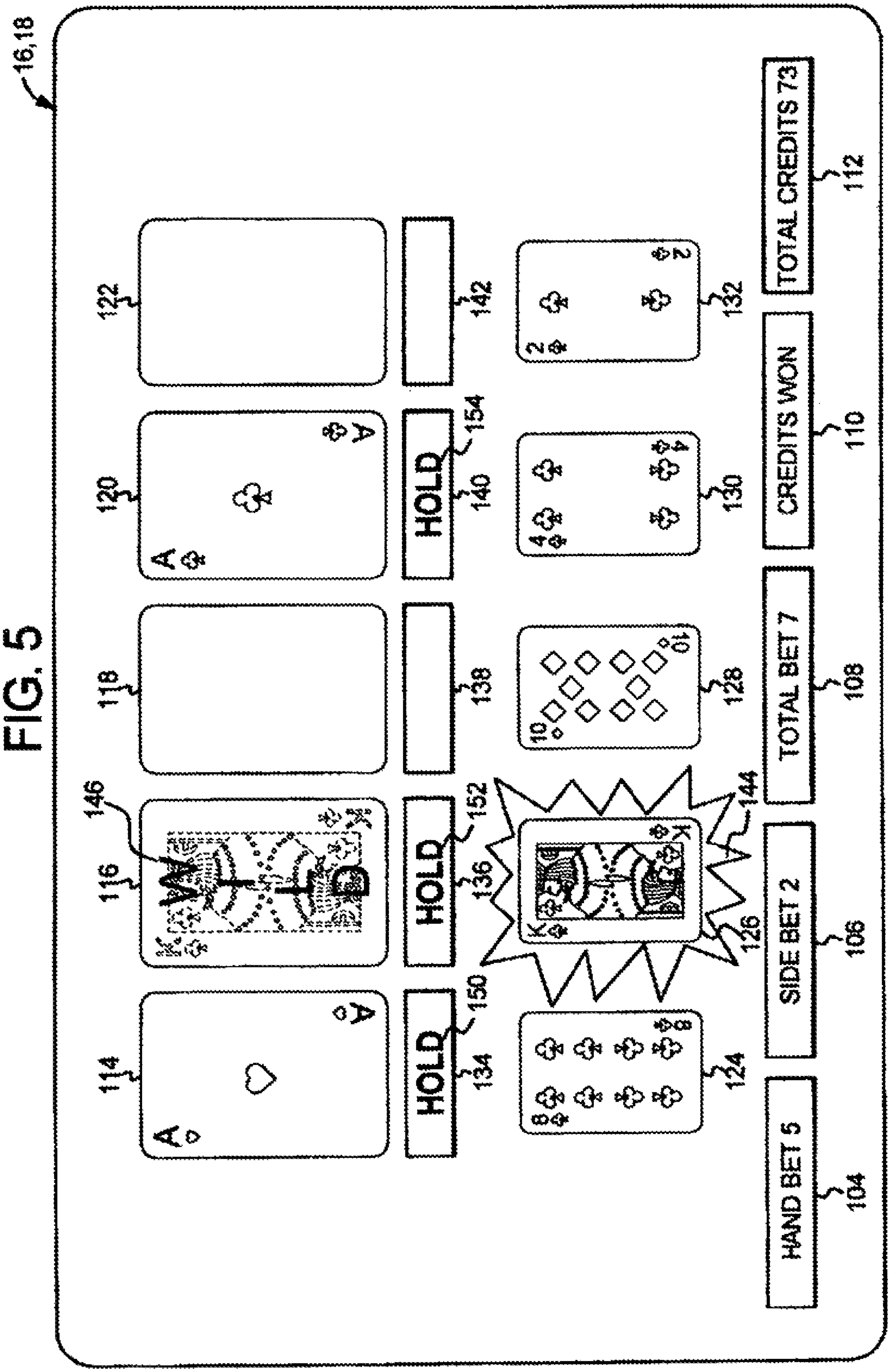

FIG. 5 refers to the game elements shown in FIG. 4 with the player using the touch-screen buttons (134, 136, 140) to elect to HOLD those cards (150, 152, 154). Initial cards 118 and 122 have been discarded.

Figure 6:
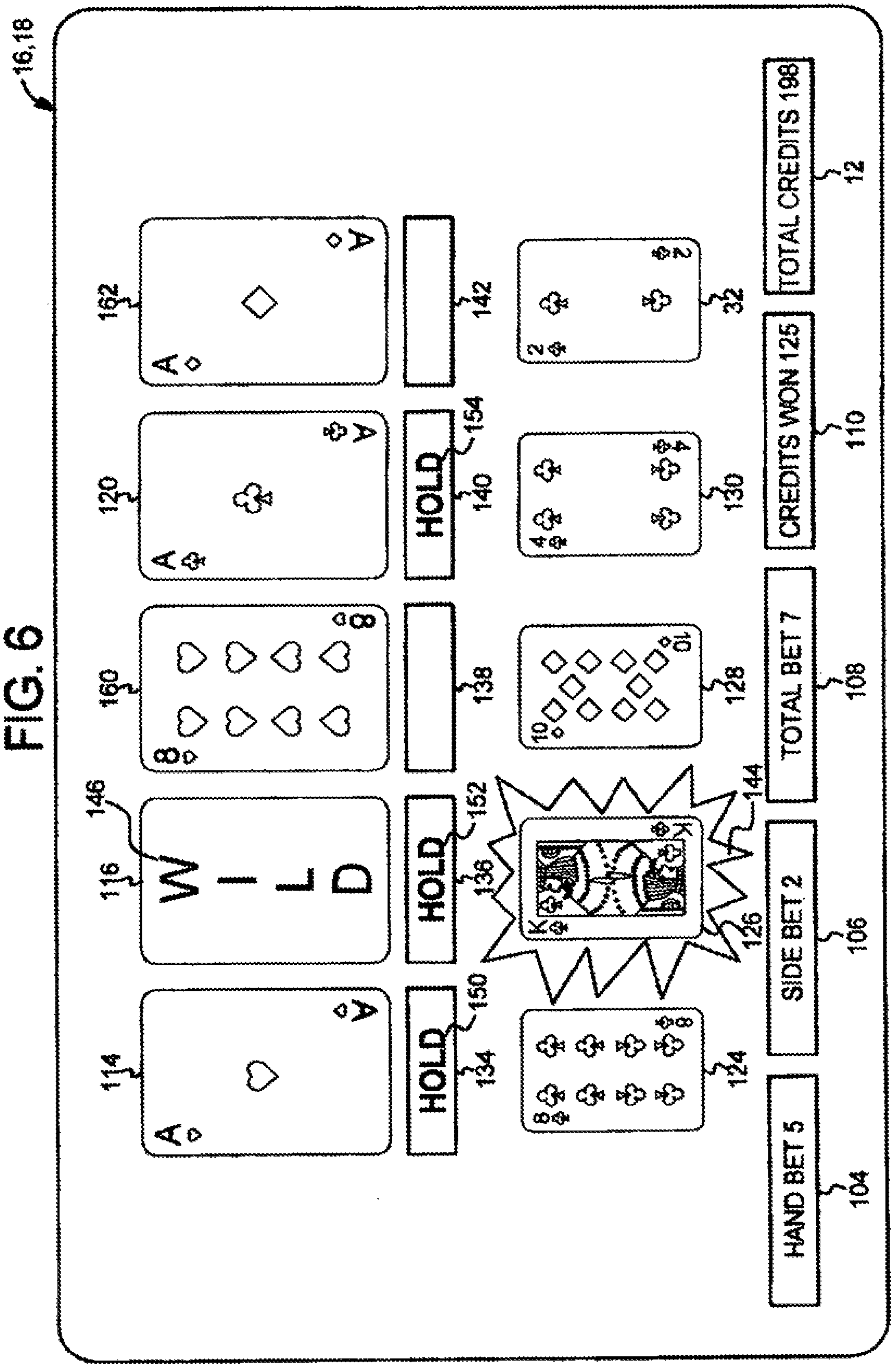

FIG. 6 refers to the game elements shown in FIG. 5 and shows the draw result, with replacement cards 160 (8 of Hearts) and 162 (Ace of Diamonds) being provided for the discarded cards. The final result of 4-of-a-Kind Aces is shown, and the win of 125 credits is displayed in the Credits Won box 110. The player's Total Credits 112 are now shown as 198 credits.

Figure 7:
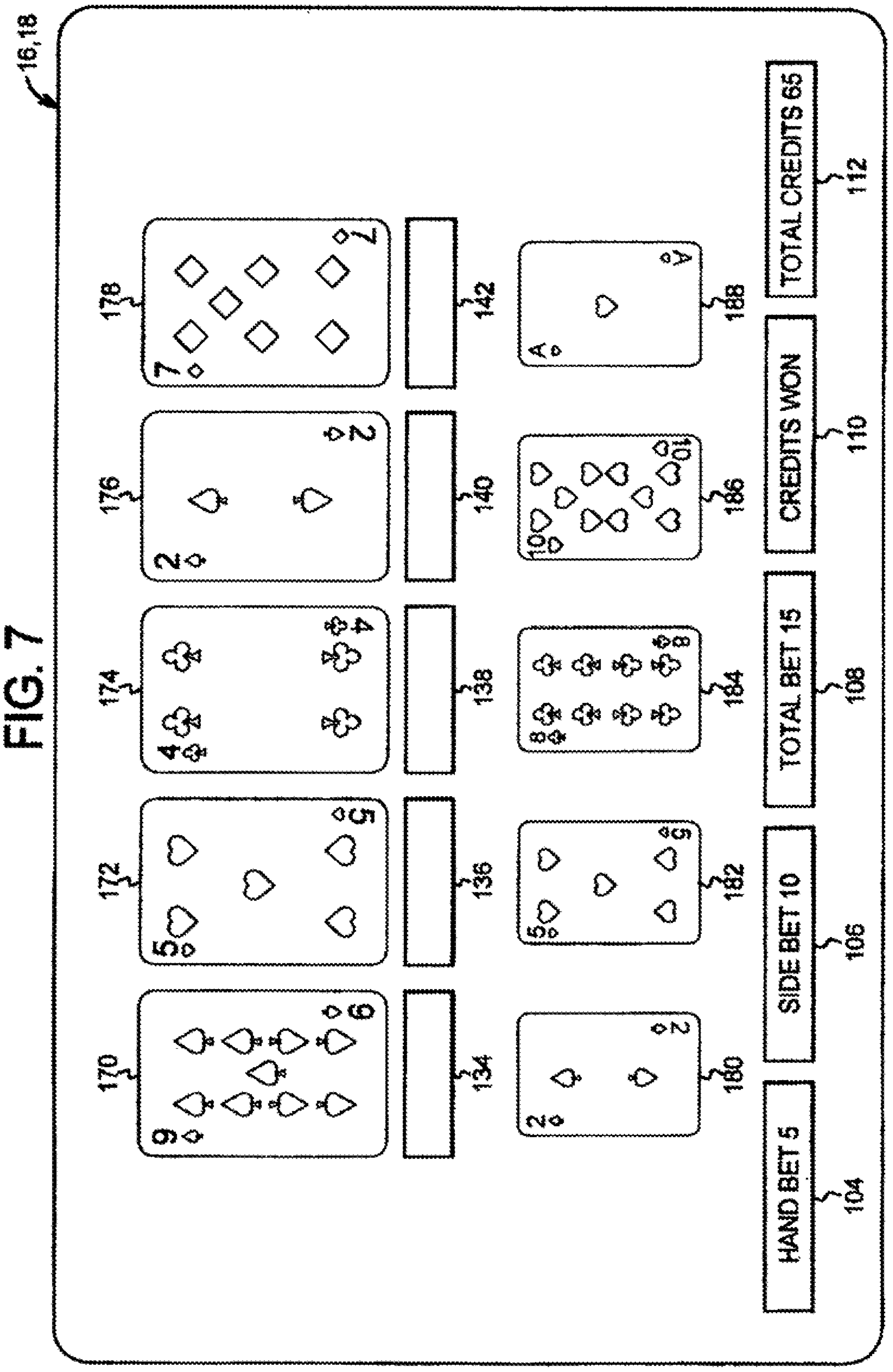
FIGS. 7, 8, 9 and 10 are front elevational views of one embodiment of the gaming device disclosed herein illustrating different stages of another example poker game disclosed herein.

FIG. 7 illustrates a different embodiment, showing a video poker machine monitor screen 16, 18 with five touch-screen HOLD/DISCARD buttons for card play selection (134, 136, 138, 140, 142). The player has wagered 5 credits to play a 5-card player's hand of Jacks or Better poker as shown on the touch-screen button 104. The player has also wagered 10 credits as a Side Bet to play the wild card bonus option as shown on the touch-screen button 106. The wild card bonus option rules require that any matches between the player's hand and the house hand must include rank and suit only (not necessarily position). The Total Bet of 15 credits is shown in the box 108. A Credits Won box is shown 110, along with the player's Total Available Credits (65 credits after the 15 credit wager) 112. The result of the initial deal of the player's hand from a first deck of 52 cards is shown, with the 9 of Spades 170 in the first card position, the 5 of Hearts 172 in the second card position, the 4 of Clubs 174 in the third card position, the 2 of Spades 176 in the fourth card position, and the 7 of Diamonds 178 in the fifth card position. The wild card bonus option provides a 5-card house hand from a separate second 52-card deck, the result of which shows the 2 of Spades 180 in the first card position, the 5 of Hearts 182 in the second card position, the 8 of Clubs 184 in the third card position, the 10 of Hearts 186 in the fourth card position, and the Ace of Spades 188 in the fifth card position.

Figure 8:
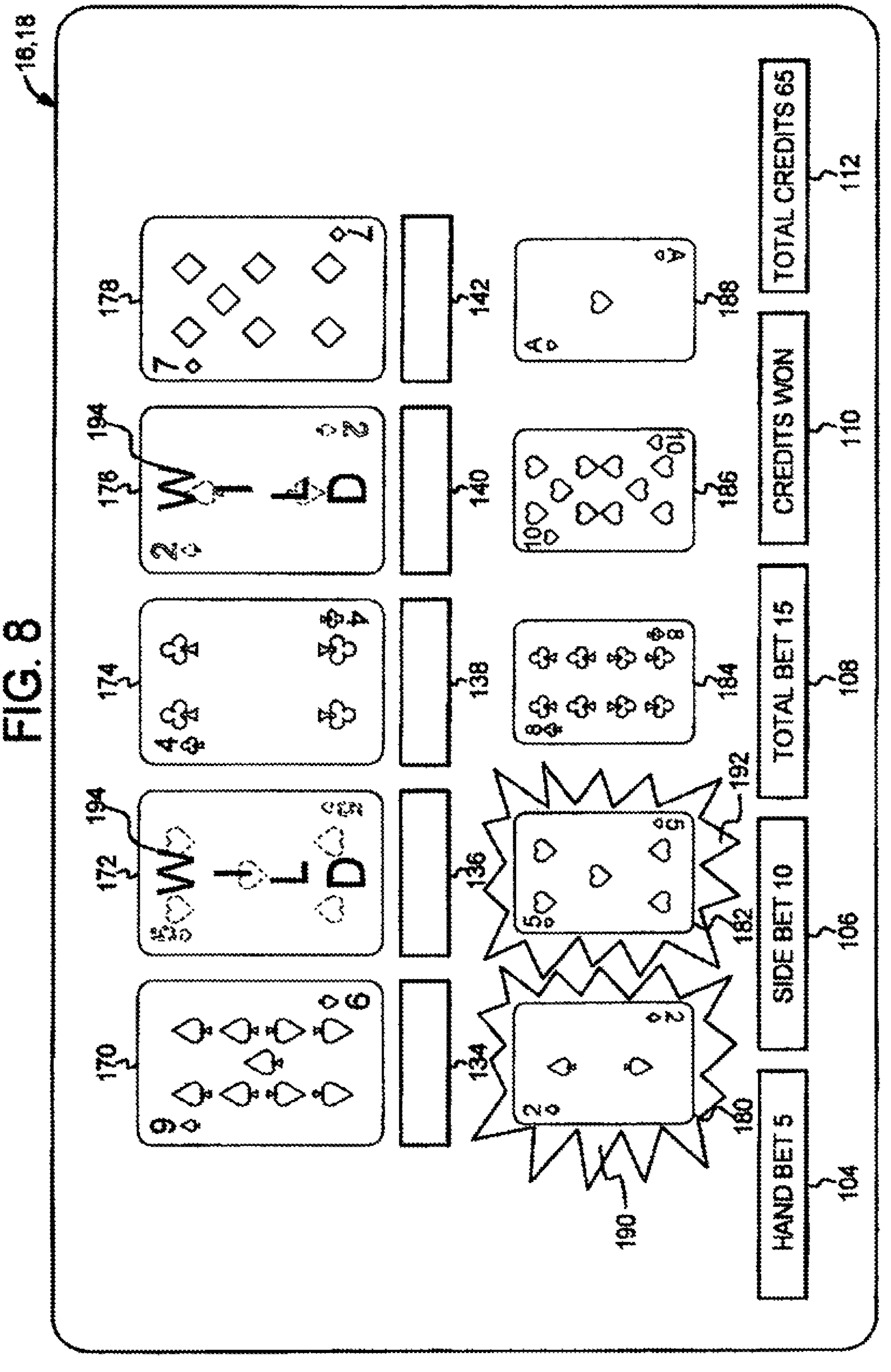

FIG. 8 refers to the game elements shown in FIG. 7 with the 2 of Spades 180 in the house hand being highlighted 190 because it matches the rank and suit of the 2 of Spades 176 in the player's hand. The 5 of Hearts 182 in the house hand is highlighted 192 because it matches the rank and suit of the 5 of Hearts 172 in the player's hand. The graphics on the those said cards in the player's hand are muted and a WILD indicia 194 and 196 is superimposed on both cards.

Figure 9:
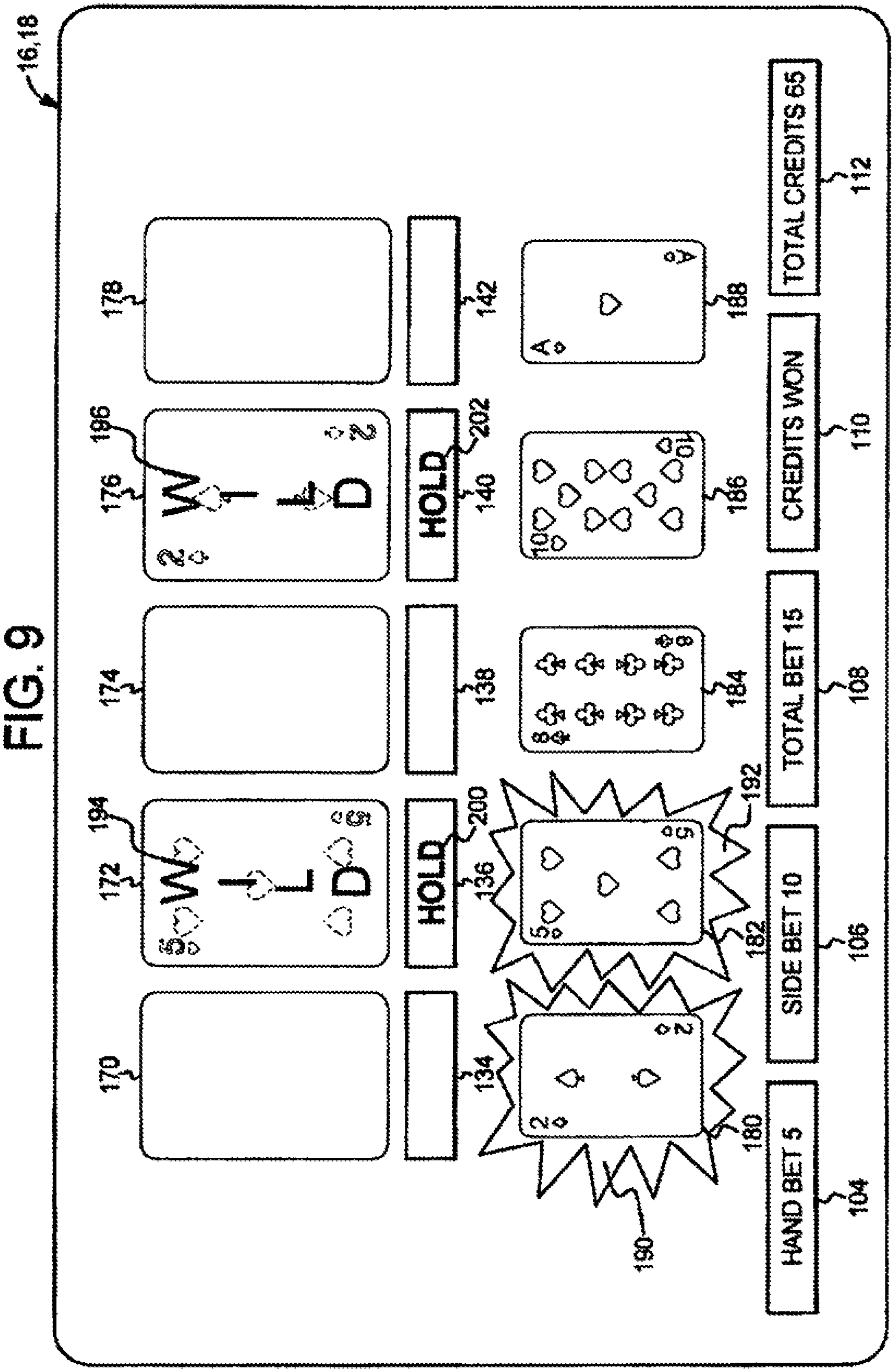

FIG. 9 refers to the game elements shown in FIG. 8 with the player using the touch-screen buttons (136 and 140) to elect to HOLD those cards (172 and 176). Initial cards 170, 174, 178 have been discarded.

Figure 10:
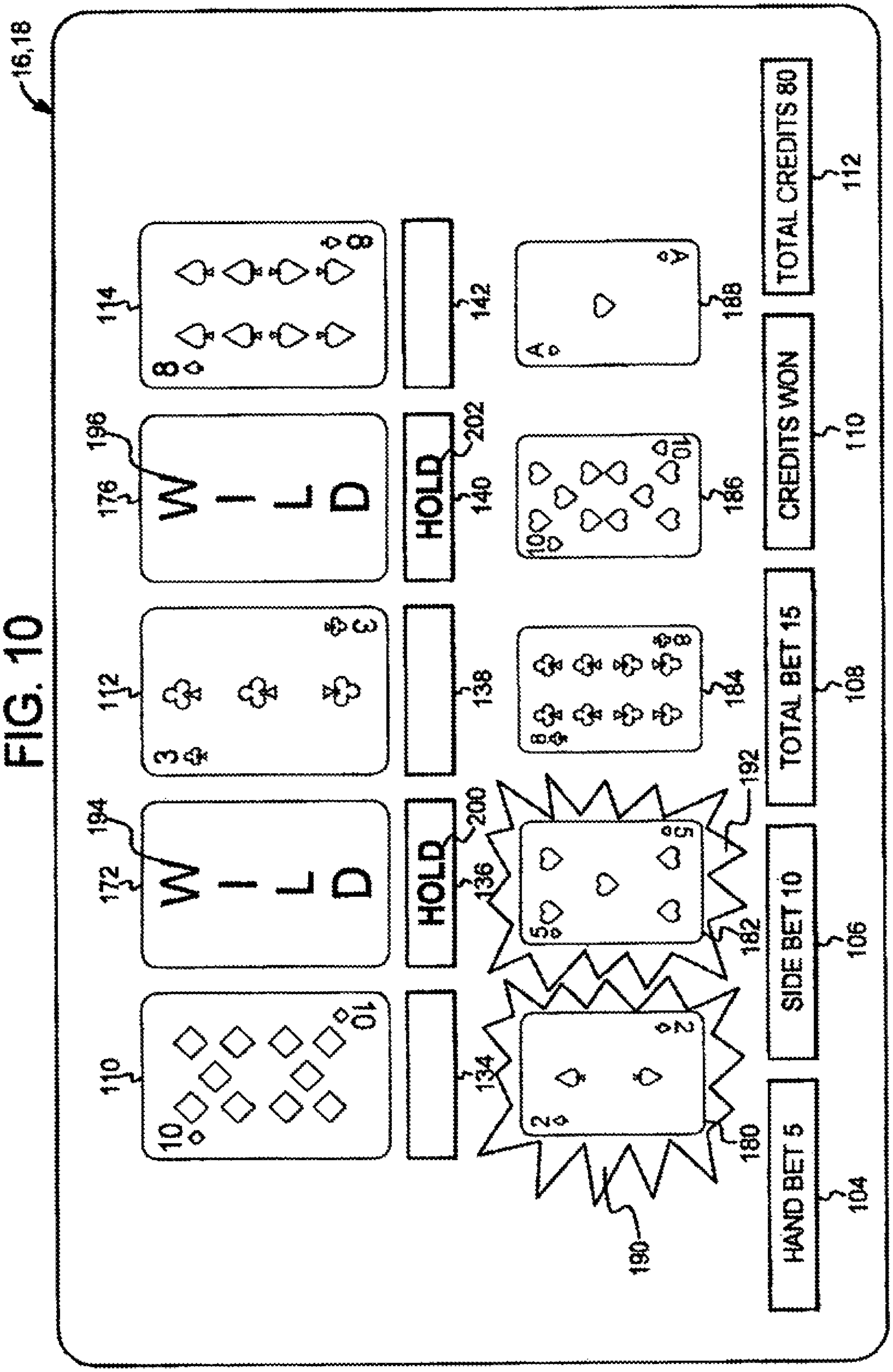

FIG. 10 refers to the game elements shown in FIG. 9 and shows the draw result, with replacement cards 200 (10 of Diamonds), 202 (3 of Clubs) and 214 (8 of Spades) being provided for the discarded cards. The final result, of 3-of-a-Kind is shown, and the win of 15 credits is displayed in the Credits Won box 110. The player's Total Credits 112 are now shown as 80 credits.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a housing;

a plurality of input devices supported by the housing, the plurality of input devices including an acceptor;

at least one display device supported by the housing;

at least one processor; and at least one memory device storing a plurality of instructions which, when executed by the at least one processor, cause the at least one processor to operate with the plurality of input devices and the at least one display device to:

(a) if a physical item associated with a monetary value is received by the acceptor, establish a credit balance based at least in part on the monetary value, wherein the physical item is one selected from the group consisting of: a ticket associated with the monetary value and currency;

(b) if an actuation of a wager button is received, place a wager, the wager being deductable from the credit balance;

(c) randomly generate and display an initial hand of a plurality of playing cards from a set of playing cards;

(d) before discarding any playing cards from the initial hand, for each of the displayed playing cards of the initial hand:

(i) randomly generate one of a plurality of different suit and value combinations;

(ii) display the randomly generated suit and value combination in association with said displayed playing card;

(iii) determine whether the displayed suit and value combination matches a playing card suit and value combination of said displayed playing card; and (iv) if the displayed suit and value combination matches the playing card suit and value combination of said displayed playing card, change said displayed playing card into a wild playing card;

(e) after changing any displayed playing cards in the initial hand into the wild playing card, enable the player to select zero, one, or a plurality of the displayed playing cards in the initial hand to discard;

(f) discard any selected playing cards from the initial hand;

(g) replace any discarded playing cards with replacement playing cards from the playing cards remaining in the set of playing cards to form a final hand of playing cards and display the final hand;

(h) display any award associated with the final hand, the credit balance being increasable by any award; and (i) if an actuation of a cashout button is received, initiate a payout associated with the credit balance.

2. The gaming system of claim 1, wherein one of the displayed suit and value combinations matches the playing card suit and value combination of one of the displayed playing cards of the initial hand when: (a) the suit of said displayed suit and value combination and the suit of the playing card suit and value combination of said displayed playing card are the same, and (b) the value of said displayed suit and value combination and the value of the playing card suit and value combination of said displayed playing card are the same.

3. The gaming system of claim 1, wherein the plurality of instructions, when executed by the at least one processor, cause the at least one processor to operate with the at least one display device and the at least one input device to: (1) provide (d)(i) to (d)(iv) if an additional wager is received, and (2) not provide (d)(i) to (d)(iv) if the additional wager is not received.

4. A method of operating a gaming system, said method comprising:

(a) if a physical item associated with a monetary value is received by an acceptor of the gaming system, causing at least one processor to execute a plurality of instructions stored in at least one memory device to establish a credit balance based at least in part on the monetary value, wherein the physical item is one selected from the group consisting of: a ticket associated with the monetary value and currency;

(b) if an actuation of a wager button is received, causing the at least one processor to execute the plurality of instructions to place a wager, the wager being deductable from the credit balance;

(c) causing the at least one processor to execute the plurality of instructions to randomly generate and operate with at least one display device to display an initial hand of a plurality of playing cards from a set of playing cards;

(d) before discarding any playing cards from the initial hand, for each of the displayed playing cards of the initial hand:

(i) causing the at least one processor to execute the plurality of instructions to randomly generate one of a plurality of different suit and value combinations;

(ii) causing the at least one processor to execute the plurality of instructions to operate with the at least one display device to display the randomly generated suit and value combination in association with said displayed playing card;

(iii) causing the at least one processor to execute the plurality of instructions to determine whether the displayed suit and value combination matches a playing card suit and value combination of said displayed playing card; and (iv) if the displayed suit and value combination matches the playing card suit and value combination of said displayed playing card, causing the at least one processor to execute the plurality of instructions to operate with the at least one display device to change said displayed playing card into a wild playing card;

(e) after changing any displayed playing cards in the initial hand into the wild playing card, enabling the player to select zero, one, or a plurality of the displayed playing cards in the initial hand to discard;

(f) causing the at least one processor to execute the plurality of instructions to operate with the at least one display device to discard any selected playing cards from the initial hand;

(g) causing the at least one processor to execute the plurality of instructions to operate with the at least one display device to replace any discarded playing cards with replacement playing cards from the playing cards remaining in the set of playing cards to form a final hand of playing cards and display the final hand;

(h) causing the at least one processor to execute the plurality of instructions to operate with the at least one display device to display any award associated with the final hand, the credit balance being increasable by any award; and (i) if an actuation of a cashout button is received, causing the at least one processor to execute the plurality of instructions to initiate a payout associated with the credit balance.

5. The method of claim 4, wherein one of the displayed suit and value combinations matches the playing card suit and value combination of one of the displayed playing cards of the initial hand when: (a) the suit of said displayed suit and value combination and the suit of the playing card suit and value combination of said displayed playing card are the same, and (b) the value of said displayed suit and value combination and the value of the playing card suit and value combination of said displayed playing card are the same.

6. The method of claim 4, which includes providing (d)(i) to (d)(iv) if an additional wager is received and not providing (d)(i) to (d)(iv) if the additional wager is not received.

7. The method of claim 4, which is provided through a data network.

8. The method of claim 7, wherein the data network is an internet.

9. A gaming system comprising:

a housing:

a plurality of input devices supported by the housing, the plurality of input devices including an acceptor;

at least one display device supported by the housing;

at least one processor; and at least one memory device storing a plurality of instructions which, when executed by the at least one processor, cause the at least one processor to operate with the plurality of input devices and the at least one display device to:

(a) if a physical item associated with a monetary value is received by the acceptor, establish a credit balance based at least in part on the monetary value, wherein the physical item is one selected from the group consisting of: a ticket associated with the monetary value and currency;

(b) if an actuation of a wager button is received, place a wager, the wager being deductable from the credit balance;

(c) randomly generate and display an initial hand of a plurality of playing cards from a set of playing cards;

(d) generate two or more of a plurality of different suit and value combinations;

(e) display the generated suit and value combinations;

(f) for each of the displayed playing cards of the initial hand:

(i) determine whether any of the displayed suit and value combinations match a playing card suit and value combination of said displayed playing card; and (ii) if one of the displayed suit and value combinations matches the playing card suit and value combination of said displayed playing card, change said displayed playing card into a wild playing card;

(g) after changing any displayed playing cards in the initial hand into the wild playing card, enable the player to select zero, one, or a plurality of the displayed playing cards in the initial hand to discard;

(h) discard any selected playing cards from the initial hand;

(i) replace any discarded playing cards with replacement playing cards from the playing cards remaining in the set of playing cards to form a final hand of playing cards and display the final hand, each replacement playing card having a replacement playing card suit and value combination;

(j) if the replacement playing card suit and value combination of any replacement playing card matches any of the displayed suit and value combinations, not change said replacement playing card into the wild playing card;

(k) display any award associated with the final hand, the credit balance being increasable by any award; and (l) if an actuation of a cashout button is received, initiate a payout associated with the credit balance.

10. The gaming system of claim 9, wherein one of the displayed suit and value combinations matches the playing card suit and value combination of one of the displayed playing cards of the initial hand when: (a) the suit of said displayed suit and value combination and the suit of the playing card suit and value combination of said displayed playing card are the same, and (b) the value of said displayed suit and value combination and the value of the playing card suit and value combination of said displayed playing card are the same.

11. The gaming system of claim 9, wherein the plurality of instructions, when executed by the at least one processor, cause the at least one processor to operate with the at least one display device and the at least one input device to: (1) provide (d) to (f) if an additional wager is received, and (2) not provide (d) to (f) if the additional wager is not received.

12. A method of operating a gaming system, said method comprising:

(a) if a physical item associated with a monetary value is received by an acceptor of the gaming system, causing at least one processor to execute a plurality of instructions stored in at least one memory device to establish a credit balance based at least in part on the monetary value, wherein the physical item is one selected from the group consisting of a ticket associated with the monetary value and currency;

(b) if an actuation of a wager button is received, causing the at least one processor to execute the plurality of instructions to place a wager, the wager being deductable from the credit balance;

(c) causing the at least one processor to execute the plurality of instructions to randomly generate and operate with at least one display device to display an initial hand of a plurality of playing cards from a set of playing cards;

(d) causing the at least one processor to execute the plurality of instructions to generate two or more of a plurality of different suit and value combinations;

(e) causing the at least one processor to execute the plurality of instructions to operate with the at least one display device to display the generated suit and value combinations;

(f) for each of the displayed playing cards of the initial hand:

(i) causing the at least one processor to execute the plurality of instructions to determine whether any of the displayed suit and value combinations match a playing card suit and value combination of said displayed playing card; and (ii) if one of the displayed suit and value combinations matches the playing card suit and value combination of said displayed playing card, causing the at least one processor to execute the plurality of instructions to operate with the at least one display device to change said displayed playing card into a wild playing card;

(g) after changing any displayed playing cards in the initial hand into the wild playing card, enabling the player to select zero, one, or a plurality of the displayed playing cards in the initial hand to discard;

(h) causing the at least one processor to execute the plurality of instructions to operate with the at least one display device to discard any selected playing cards from the initial hand;

(i) causing the at least one processor to execute the plurality of instructions to operate with the at least one display device to replace any discarded playing cards with replacement playing cards from the playing cards remaining in the set of playing cards to form a final hand of playing cards and display the final hand, each replacement playing card having a replacement playing card suit and value combination;

(j) if the replacement playing card suit and value combination of any replacement playing card matches any of the displayed suit and value combinations, causing the at least one processor to execute the plurality of instructions to not change said replacement playing card into the wild playing card;

(k) causing the at least one processor to execute the plurality of instructions to operate with the at least one display device to display any award associated with the final hand, the credit balance being increasable by any award; and (l) if an actuation of a cashout button is received, causing the at least one processor to execute the plurality of instructions to initiate a payout associated with the credit balance.

13. The method of claim 12, wherein one of the displayed suit and value combinations matches the playing card suit and value combination of one of the displayed playing cards of the initial hand when: (a) the suit of said displayed suit and value combination and the suit of the playing cad suit and value combination of said displayed playing card are the same, and (b) the value of said displayed suit and value combination and the value of the playing cad suit and value combination of said displayed playing card are the same.

14. The method of claim 12, which includes providing (d) to (f) if an additional wager is received, and not providing (d) to (f) if the additional wager is not received.

15. The method of claim 12, which is provided through a data network.

16. The method of claim 15, wherein the data network is an internet.

17. A gaming system comprising:

a housing;

a plurality of input devices supported by the housing, the plurality of input devices including:

(i) an acceptor configured to receive a physical item associated with a monetary value, and (ii) a cashout button actuatable to cause an initiation of a payout associated with a credit balance;

at least one display device supported by the housing;

at least one processor; and at least one memory device storing a plurality of instructions which, when executed by the at least one processor, cause the at least one processor to operate with the plurality of input devices and the at least one display device to:

(a) if the physical item is received by the acceptor, establish the credit balance based at least in part on the monetary value, wherein the physical item is one selected from the group consisting of: a ticket associated with the monetary value and currency;

(b) if an actuation of a wager button is received, place a wager, the wager being deductable from the credit balance;

(c) randomly generate and display an initial hand of a plurality of playing cards from a set of playing cards;

(d) for each of the displayed playing cards of the initial hand:

(i) generate one of a plurality of different suit and value combinations;

(ii) display the generated suit and value combination in association with said displayed playing card;

(iii) determine whether the displayed suit and value combination matches a playing card suit and value combination of said displayed playing card; and (iv) if the displayed suit and value combination matches the playing card suit and value combination of said displayed playing card, change said displayed playing card into a wild playing card;

(e) after changing any displayed playing cards in the initial hand into the wild playing card, enable the player to select zero, one, or a plurality of the displayed playing cards in the initial hand to discard;

(f) discard any selected playing cards from the initial hand;

(g) replace any discarded playing cards with replacement playing cards from the playing cards remaining in the set of playing cards to form a final hand of playing cards and display the final hand, each replacement playing card having a replacement playing card suit and value combination;

(h) if the replacement playing card suit and value combination of any replacement playing card matches any of the displayed suit and value combinations, not change said replacement playing card into the wild playing card; and (i) display any award associated with the final hand, the credit balance being increasable by any award; and (j) if an actuation of the cashout button is received, initiate the payout.

18. A method of operating a gaming system, said method comprising:

following receipt, via an acceptor, of a physical item associated with a monetary value, the physical item selected from the group consisting of a ticket associated with the monetary value and currency, and establishment of a credit balance based at least in part on the monetary value, for a play of a poker game:

(a) if an actuation of a wager button is received, causing at least one processor to execute a plurality of instructions stored in at least one memory device to place a wager, the wager being deductable from the credit balance;

(b) causing the at least one processor to execute the plurality of instructions to randomly generate and operate with at least one display device to display an initial hand of a plurality of playing cards from a set of playing cards;

(c) for each of the displayed playing cards of the initial hand:

(i) causing the at least one processor to execute the plurality of instructions to generate one of a plurality of different suit and value combinations;

(ii) causing the at least one processor to execute the plurality of instructions to operate with the at least one display device to display the generated suit and value combination in association with said displayed playing card;

(iii) causing the at least one processor to execute the plurality of instructions to determine whether the displayed suit and value combination matches a playing card suit and value combination of said displayed playing card; and (iv) if the displayed suit and value combination matches the playing card suit and value combination of said displayed playing card, causing the at least one processor to execute the plurality of instructions to operate with the at least one display device to change said displayed playing card into a wild playing card;

(d) after changing any displayed playing cards in the initial hand into the wild playing card, enabling the player to select zero, one, or a plurality of the displayed playing cards in the initial hand to discard;

(e) causing the at least one processor to execute the plurality of instructions to operate with the at least one display device to discard any selected playing cards from the initial hand;

(f) causing the at least one processor to execute the plurality of instructions to operate with the at least one display device to replace any discarded playing cards with replacement playing cards from the playing cards remaining in the set of playing cards to form a final hand of playing cards and display the final hand, each replacement playing card having a replacement playing card suit and value combination;

(g) if the replacement playing card suit and value combination of any replacement playing card matches any of the displayed suit and value combinations, causing the at least one processor to execute the plurality of instructions to not change said replacement playing card into the wild playing card;

(h) causing the at least one processor to execute the plurality of instructions to operate with the at least one display device to display any award associated with the final hand, the credit balance being increasable by any award; and (i) if an actuation of a cashout button is received, causing the at least one processor to execute the plurality of instructions to initiate a payout associated with the credit balance.

* * * * *